Patented Jan. 3, 1928.

1,654,709

UNITED STATES PATENT OFFICE.

LAMBERT THORP, OF CINCINNATI, OHIO.

ARYLARSONIC ACID.

No Drawing.   Application filed May 14, 1927.   Serial No. 191,548.

This invention relates to the class of organic chemical compounds known as arylarsonic acids.

The object of this invention is to provide arylarsonic acids having medical value in the treatment of certain diseases as well as novel chemical structure.

I have found that the aryl amino acyl urethane arsonic acids are valuable for medicinal purposes in the treatment of trypanosomiases and kindred infections.

The aryl amino acyl urethane arsonic acids are, in general, colorless, crystalline compounds, slightly soluble in cold water, readily soluble in alkaline hydroxides, carbonates, bicarbonates or ammonia, very slightly soluble in ether, decomposed by means of warm alkaline hydroxides into ammonia, an alcohol and an alkaline carbonate and displaying marked trypanocidal power.

The aryl amino acyl urethane arsonic acids may be prepared, for instance, as follows: four parts, by weight, of sodium hydroxide are dissolved in one hundred and fifty parts, by weight, of water, twenty-one parts, by weight of arsanilic acid are then added, followed by sixteen parts, by weight, of chloroacetyl ethyl urethane. Sufficient alcohol is now added to produce a homogeneous solution. The solution is warmed in a suitable vessel, provided with a reflux condenser for one or two hours on the water bath. The white, crystalline product, namely, phenylamino acetyl ethyl urethane p-arsonic acid is filtered and recrystallized from a mixture of alcohol and water. This product occurs as beautiful, snow-white crystals, slightly soluble in cold water, readily soluble in sodium hydroxide, sodium carbonate, sodium bicarbonate or ammonia, very slightly soluble in ether, decomposed by means of warm sodium hydroxide into ammonia, ethyl alcohol and sodium carbonate and displaying marked trypanocidal power.

The reaction illustrating the formation of the above compound, namely, phenylamino acetyl ethyl urethane p-arsonic acid, may be written as follows:

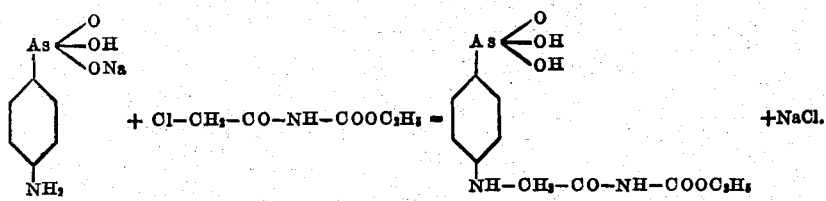

Of the series of aryl amino acyl urethane arsonic acids, this particular member, namely, phenylamino acetyl ethyl urethane p-arsonic acid, is characterized by great stability to heat. Thus, when heated slowly in a capillary tube it does not melt, but turns brown in the vicinity of 300° C., thus indicating decomposition of the molecule.

In a similar way other aryl amino acyl urethane arsonic acids may be prepared.

Having described my invention, what I claim is:—

1. As new products, the aryl amino acyl urethane arsonic acids, being, in general, colorless, crystalline compounds, slightly soluble in cold water, readily soluble in alkaline hydroxides, carbonates, bicarbonates or ammonia, very slightly soluble in ether, decomposed by means of warm alkaline hydroxides into ammonia, an alcohol and an alkaline carbonate and displaying marked trypanocidal power.

2. As an article of manufacture, phenylamino acetyl ethyl urethane p-arsonic acid, being a colorless, crystalline compound, slightly soluble in cold water, readily soluble in sodium hydroxide, sodium carbonate, sodium bicarbonate or ammonia, very slightly soluble in ether, decomposed by means of warm sodium hydroxide into ammonia, ethyl alcohol and sodium carbonate, characterized by great stability to heat, not melting when heated slowly in a capillary tube, but turning brown and decomposing in the vicinity of 300° C., and displaying marked trypanocidal power.

In witness whereof, I hereunto subscribe my name.

LAMBERT THORP.